United States Patent
Koegler et al.

(10) Patent No.: US 9,039,380 B2
(45) Date of Patent: May 26, 2015

(54) WINGLET FOR A WIND TURBINE ROTOR BLADE

(75) Inventors: Klaus Ulrich Koegler, Rheine (DE); Stefan Herr, Greenville, SC (US); Ramesh Vedula, Bangalore (IN)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 13/459,412

(22) Filed: Apr. 30, 2012

(65) Prior Publication Data
US 2012/0275925 A1    Nov. 1, 2012

(30) Foreign Application Priority Data
Apr. 30, 2011   (IN) .......................... 1273/DEL/2011

(51) Int. Cl.
F03D 1/06     (2006.01)

(52) U.S. Cl.
CPC ............. *F03D 1/0675* (2013.01); *Y02E 10/721* (2013.01)

(58) Field of Classification Search
USPC .................................................. 416/228, 238
See application file for complete search history.

(56) References Cited

U.S. PATENT DOCUMENTS

| | | | |
|---|---|---|---|
| 5,102,068 A | 4/1992 | Gratzer | |
| 5,275,358 A | 1/1994 | Goldhammer et al. | |
| 5,332,362 A | 7/1994 | Toulmay et al. | |
| 5,348,253 A | 9/1994 | Gratzer | |
| 5,643,613 A | 7/1997 | Bott et al. | |
| 6,089,502 A | 7/2000 | Herrick et al. | |
| 6,142,738 A | 11/2000 | Toulmay | |
| 7,207,526 B2 | 4/2007 | McCarthy | |
| 7,275,722 B2 | 10/2007 | Irving et al. | |
| 7,497,403 B2 | 3/2009 | McCarthy | |
| 7,540,716 B2 | 6/2009 | Wobben | |
| 7,841,836 B2 * | 11/2010 | Wobben ......................... | 416/228 |
| 7,931,444 B2 | 4/2011 | Godsk et al. | |
| 7,988,100 B2 | 8/2011 | Mann | |
| 2002/0092947 A1 | 7/2002 | Felker | |
| 2006/0216152 A1 | 9/2006 | Golinkin et al. | |
| 2006/0216153 A1 | 9/2006 | Wobben | |
| 2007/0252031 A1 | 11/2007 | Hackett et al. | |
| 2009/0074583 A1 | 3/2009 | Wobben | |
| 2009/0257885 A1 | 10/2009 | Godsk et al. | |
| 2011/0243736 A1 * | 10/2011 | Bell .......................... | 416/132 R |

FOREIGN PATENT DOCUMENTS

| | | |
|---|---|---|
| EP | 1493660 | 1/2005 |
| EP | 1500814 | 1/2005 |
| EP | 1596063 | 11/2005 |

(Continued)

OTHER PUBLICATIONS

U.S. Appl. No. 13/424,518, filed Mar. 20, 2012.

*Primary Examiner* — Richard Edgar
(74) *Attorney, Agent, or Firm* — Dority & Manning, P.A.

(57) ABSTRACT

A winglet for a rotor blade is disclosed. The winglet may generally include a winglet body extending between a first end and a second end. The winglet body may define a sweep and may have a curvature defined by a curve fit including a first radius of curvature and a second radius of curvature. The sweep between the first end and the second end may range from about 580 millimeters to about 970 millimeters. Additionally, the first radius of curvature may range from about 1500 millimeters to about 2500 millimeters and the second radius of curvature may range from about 1200 millimeters to about 2000 millimeters.

20 Claims, 4 Drawing Sheets

(56) References Cited

FOREIGN PATENT DOCUMENTS

| | | |
|---|---|---|
| EP | 1645506 | 4/2006 |
| WO | WO 02/083497 | 10/2002 |
| WO | WO 2005/078277 | 8/2005 |
| WO | WO 2006/111272 | 10/2006 |
| WO | WO 2006/133715 | 12/2006 |
| WO | WO 2008/061739 | 5/2008 |
| WO | WO 2008/077403 | 7/2008 |

* cited by examiner

WINGLET FOR A WIND TURBINE ROTOR BLADE

FIELD OF THE INVENTION

The present subject matter relates generally to rotor blades for wind turbines, and more particularly, to winglets for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy output by modifying the size, configuration and capacity of wind turbines. One such modification has been to include a wingtip device, such as a winglet, at the tip of each wind turbine rotor blade. However, the use of conventional winglets often provides a variety of disadvantages. For instance, many conventional winglets are configured as suction side winglets, thereby decreasing the clearance between the rotor blades and the wind turbine tower. Additionally, many conventional winglets are designed solely to reduce noise generated by the wind turbine. As such, these winglets generally do not provide an overall impact on the performance and efficiency of the wind turbine.

Accordingly, a pressure side winglet that generally improves the overall performance and efficiency of a wind turbine would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present subject matter discloses a winglet for a rotor blade. The winglet may generally include a winglet body extending between a first end and a second end. The winglet body may define a sweep and may have a curvature defined by a curve fit including a first radius of curvature and a second radius of curvature. The sweep between the first end and the second end may range from about 580 millimeters to about 970 millimeters. Additionally, the first radius of curvature may range from about 1500 millimeters to about 2500 millimeters and the second radius of curvature may range from about 1200 millimeters to about 2000 millimeters.

In another aspect, the present subject matter discloses a winglet for a rotor blade. The winglet may generally include a winglet body extending between a first end and a second end. The winglet body may include a plurality of radial locations between the first and second ends and may define a chord and a twist angle at each of the plurality of radial locations generally in accordance with the values for chord and twist angle shown in TABLE 1. Each of the values for chord shown in TABLE 1 may be varied +/−25% and each of the values for twist angle shown in TABLE 1 may be varied +/−2.5 degrees In a further aspect, the present subject matter discloses a winglet for a rotor blade. The winglet may generally include a winglet body defining cross-sectional profiles at a plurality of radial locations along the winglet body generally in accordance with the values shown in TABLE 1. The cross-sectional profiles may be joined so as to define a nominal shape of the winglet body. Additionally, the nominal shape lies in an envelope within +/−10% of each length value provided in TABLE 1, within +/−20 degrees of each cant angle value provided in TABLE 1 and within +/−1 degree of each toe angle and twist angle value provided in TABLE 1.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses a winglet for a wind turbine rotor blade. In particular, the present subject matter discloses a pressure side winglet having a unique geometric shape. For example, in several embodiments, the winglet may be defined by one or more design parameters including, but not limited to, spanwise radius, chord, pitch axis, sweep, pre-bend, twist angle, cant angle, toe angle and radius of curvature. By defining the shape using such design parameters and using particular ranges of values within such design parameters, it has been found that the disclosed winglet may generally improve the overall performance and efficiency of a wind turbine.

Figure 1:
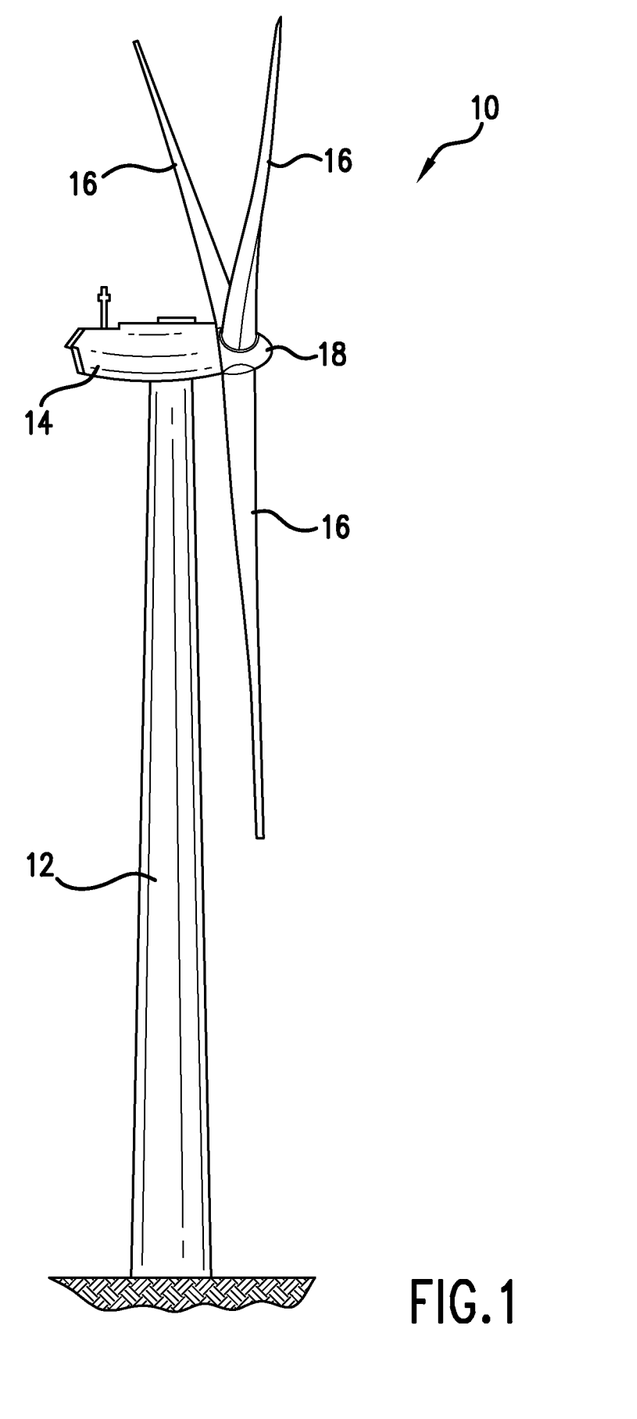
FIG. 1 illustrates a perspective view of one embodiment of a wind turbine of conventional construction.

Referring now to the drawings, FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
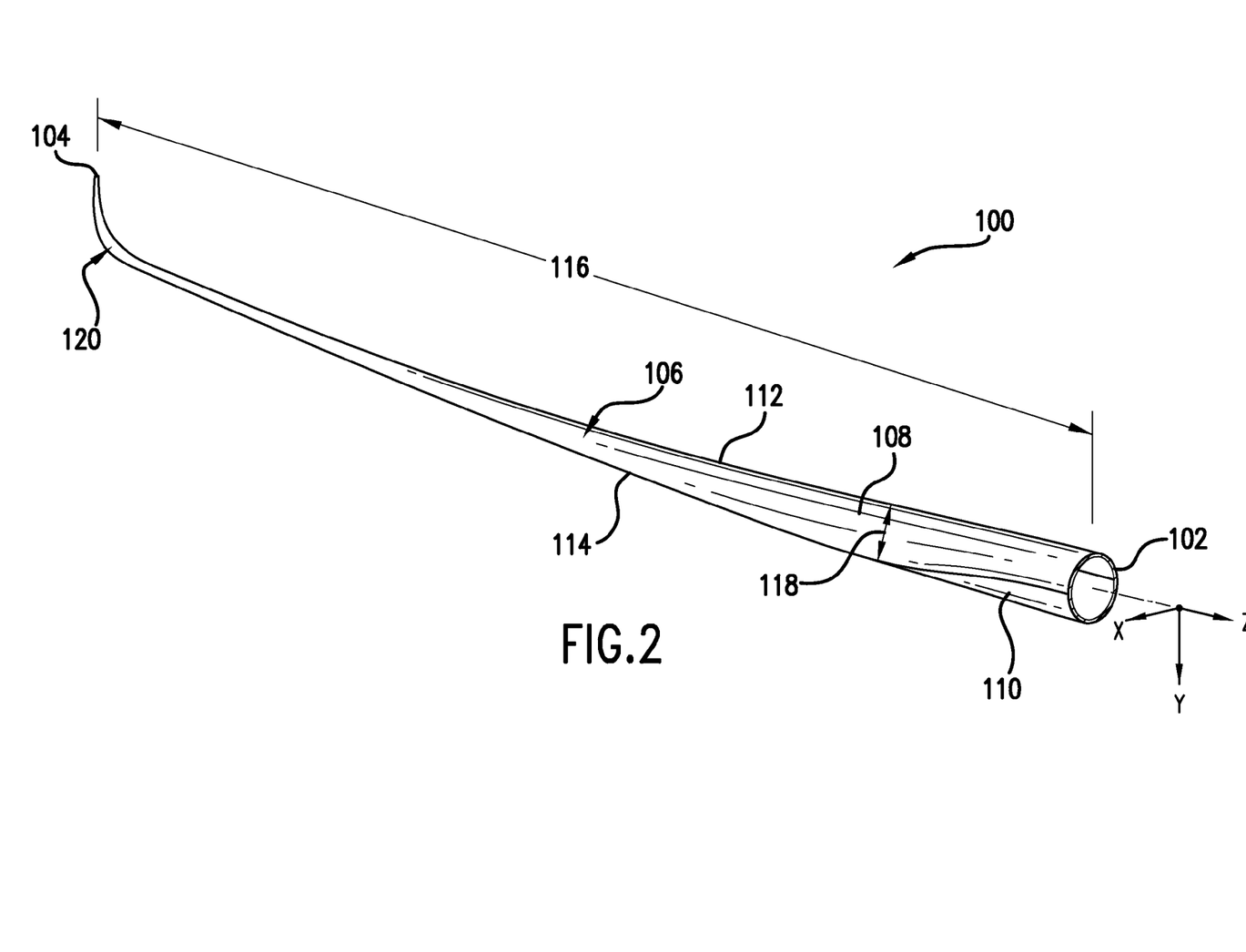
FIG. 2 illustrates a perspective view of one embodiment of a rotor blade suitable for use with the wind turbine shown in FIG. 1 in accordance with aspects of the present subject matter, particularly illustrating the rotor blade including a winglet.

Referring to FIG. 2, a perspective view of one embodiment of a rotor blade 100 suitable for use with a wind turbine 10 (FIG. 1) is illustrated in accordance with aspects of the present subject matter. As shown, the rotor blade 100 generally includes a blade root 102 configured for mounting the rotor blade 100 to the rotor hub 18 of the wind turbine 10 (FIG. 1) and a blade tip 104 disposed opposite the blade root 102. A body 106 of the rotor blade 100 may generally extend from the blade root 102 towards the blade tip 104 and may serve as the outer shell of the rotor blade 100. As is generally understood, the body 106 may define an aerodynamic profile, such as by defining a symmetrical or cambered airfoil-shaped cross-section, to enable the rotor blade 100 to capture kinetic energy from the wind using known aerodynamic principles. As such, the body 106 may generally include a pressure side 108 and a suction side 110 extending between a leading edge 112 and a trailing edge 114. Additionally, the rotor blade 100 may have a span 116 defining the total length of the blade between the blade root 102 and the blade tip 104 and a chord 118 defining the total length of the body 106 between the leading edge 112 and the trailing edge 114. As is generally understood, the chord 118 may vary in length with respect to the span 116 as the rotor blade 100 extends between the blade root 102 to the blade tip 104.

Moreover, as will be described in greater detail below, the rotor blade 100 may also include a pressure side winglet 120 terminating at the blade tip 104. It should be appreciated that, in several embodiments, the winglet 120 may be manufactured as a separate component from the body 106 and, thus, may be configured to be mounted to the body 106 using any suitable means and/or method known in the art (e.g., by using suitable fasteners and/or adhesives). As such, the winglet 120 may be retrofit onto existing rotor blades 100, such as by removing a portion of the exiting rotor blade adjacent to the blade tip 104 and replacing such removed portion with the disclosed winglet 120. Alternatively, the winglet 120 and the body 106 may be formed integrally as a single component. For instance, in one embodiment, the winglet 120 and the body 106 may be cast together in a common mold.

For reference purposes only, it should be appreciated that the X, Y and Z directions referenced herein are generally defined as the typical directional axes utilized for conventional straight rotor blades (i.e., rotor blades that have no winglet and that are not swept, pre-bent, twisted or the like). Accordingly, the Z direction is defined along a straight axis (indicated by the axis shown in FIGS. 2, 3 and 4) extending parallel to the span 116 of the rotor blade 100. The X direction is defined along a straight axis (indicated by the axis shown in FIGS. 2, 4 and 5) extending perpendicular to the Z axis such that, assuming that the rotor blade 100 has a straight configuration, the X axis extends between the leading and trailing edges 112, 114 of the body 106. The Y direction is defined along a straight axis (indicated by the axis shown in FIGS. 2, 3 and 4) extending perpendicular to the Z and X axes such that, assuming that the rotor blade 100 has a straight configuration, the Y axis extends between the pressure and suction sides 108, 110 of the body 106. Additionally, as shown in FIG. 2, the origin of the X, Y and Z axes may be defined relative to the rotor blade 100 such that the positive X direction extends towards the trailing edge 114 of the body 106 and the positive Y direction extends towards the suction side 110 of the body 106.

Figures 3, 4:
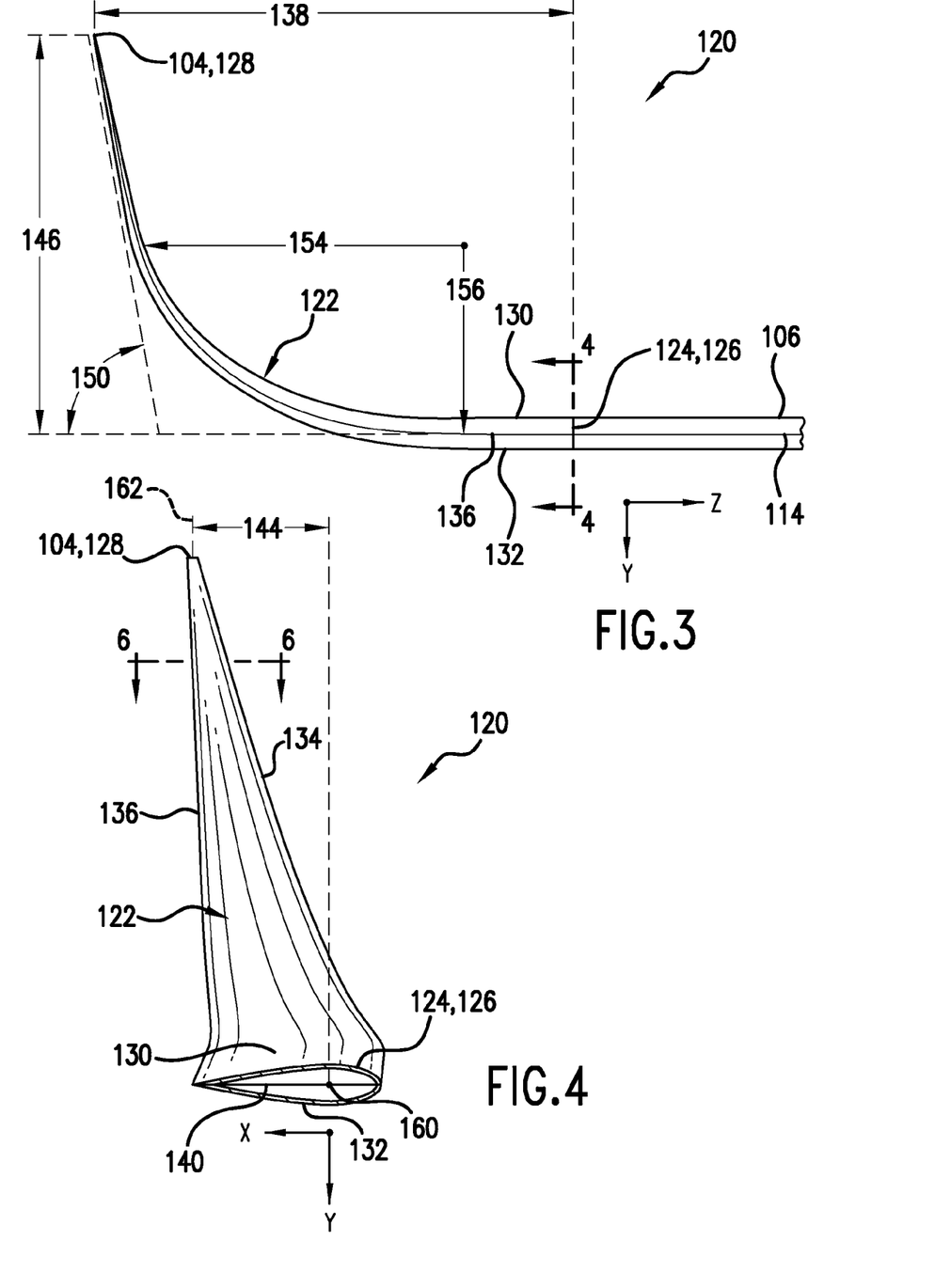
FIG. 3 illustrates a trailing edge view of the winglet shown in FIG. 2.
FIG. 4 illustrates a spanwise view of the winglet shown in FIG. 3 taken at line 4-4.
Figure 5:
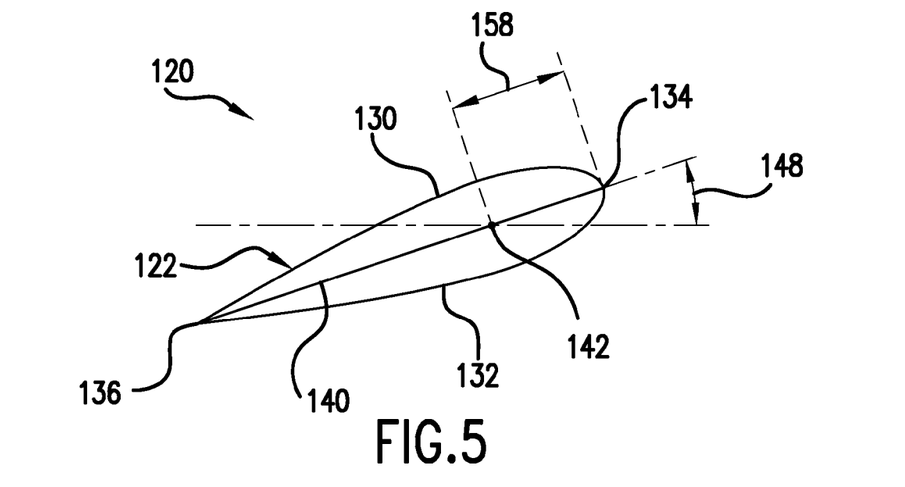
FIG. 5 illustrates a local cross-sectional view of a particular cross-sectional profile of the winglet shown in FIG. 3; and, FIG. 6 illustrates a top, cross-sectional view of the winglet shown in FIG. 4 taken along line 6-6.
Figure 6:
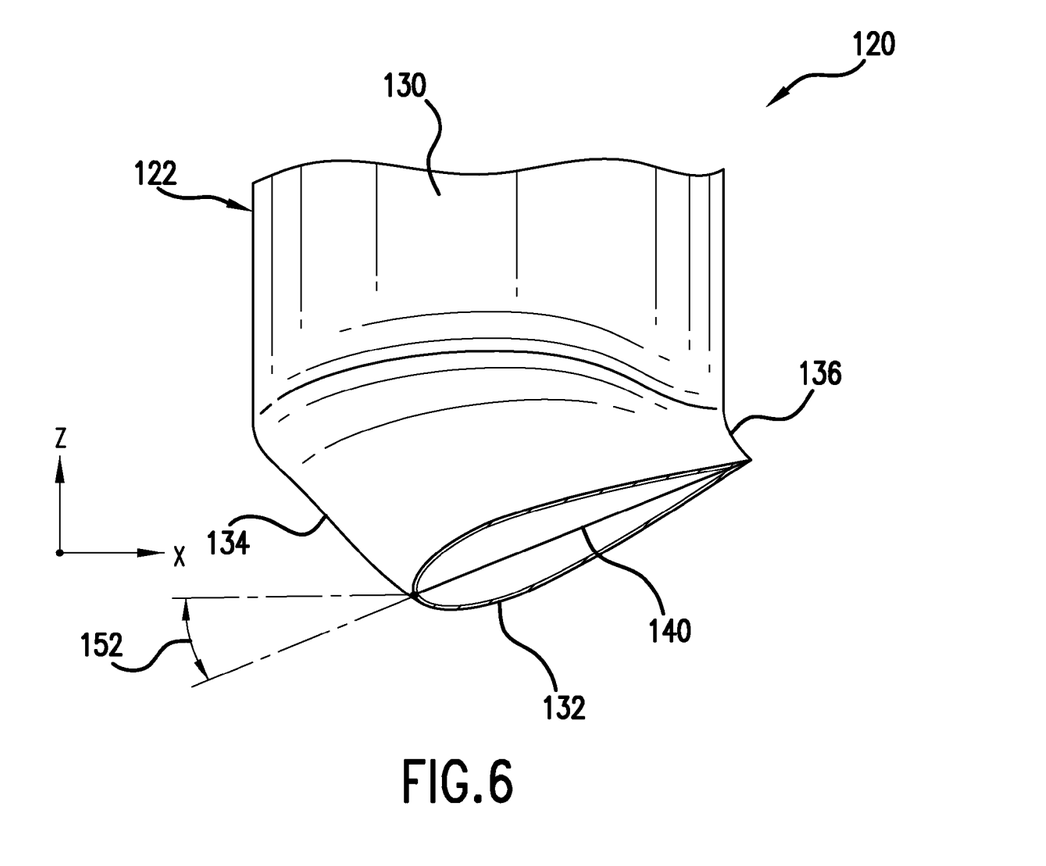

Referring now to FIGS. 3-6, various views of the embodiment of the winglet 120 shown in FIG. 2 are illustrated in accordance with aspects of the present subject matter. In particular, FIG. 3 illustrates a trailing edge view of the winglet 120 shown in FIG. 2. FIG. 4 illustrates a spanwise view of the winglet 120 shown in FIG. 3 taken at line 4-4. FIG. 5 illustrates a local cross-sectional view of a particular cross-sectional profile of the winglet 120 shown in FIG. 3. Additionally, FIG. 6 illustrates a top, cross-sectional view of the winglet 120 shown in FIG. 4 taken along line 6-6.

As particularly shown in FIG. 3, the disclosed winglet 120 generally comprises a winglet body 122 extending from a first end 124 disposed at an interface 126 defined between the winglet 120 and the body 106 to a second end 128 disposed at the blade tip 104. In general, the winglet body 122 may be configured similarly to the body 106 of the rotor blade 100. For instance, the winglet body 122 may generally define an aerodynamic profile, such as by defining a symmetrical or cambered airfoil-shaped cross-section. Thus, the winglet body 122 may also include a pressure side 130 and a suction side 132 extending between a leading edge 134 and a trailing edge 136. It should be appreciated that, in several embodiments, the aerodynamic profile of the winglet body 122 at the interface 126 (i.e., at the first end 124 of the winglet body 122) may generally correspond to the aerodynamic profile of the body 106 at the interface 126 such that a generally smooth and continuous aerodynamic profile may be defined between the winglet 120 and the body 106.

Additionally, in accordance with aspects of the present subject matter, the winglet body 122 may also have a unique geometric shape designed to improve the overall efficiency and performance of the rotor blade 100. In particular, due to the unique shape, the disclosed winglet 120 may enhance the displacement of vortices at the blade tip 104, thereby decreasing tip losses and increasing the power coefficient of the wind turbine 10 (FIG. 1). The winglet shape is also designed to increase the annual energy production (AEP) of the wind turbine 10 without increasing loads (e.g., thrust) or the rotor diameter, thereby reducing the cost of the energy generated by the wind turbine 10. Moreover, because the winglet 120 is configured as a pressure side winglet, the clearance between the rotor blade 100 and the tower 12 (FIG. 1) is not decreased.

In general, the unique shape of the winglet body 120 may be defined by one or more design parameters including, but not limited to, spanwise radius 138, chord 140, pitch axis 142, sweep 144, pre-bend 146, twist angle 148, cant angle 150, toe angle 152 and radius of curvature 154, 156, all of which are design parameters that are generally known and understood by those of ordinary skill in the aerodynamic arts. For purposes of the present disclosure, one or more of these design parameters may be defined relative to the interface 126 between the winglet body 122 and the body 106 (i.e., relative to the first end 124 of the winglet body 122). However, as indicated above, the disclosed winglet 120 may be formed separately from or integrally with the body 106. Thus, it should be appreciated that the use of the term "interface" need not be limited to embodiments in which the winglet body 122 is formed as a separate component and is separately mounted to the body 106. Rather, the term "interface" generally corresponds to the point at which the disclosed winglet shape originates along the span 116 of the rotor blade 100, with the winglet body 122 extending from the interface 126 to the blade tip 104. Thus, in embodiments in which the winglet body 122 and the body 106 are formed integrally, the term "interface" may be used to simply correspond to a reference location from which the shape of the disclosed winglet body 122 is defined.

As shown in FIG. 3, the disclosed winglet 120 may generally define a spanwise length or radius 138 corresponding to the length of the winglet body 122 along the Z axis. In particular, the spanwise radius 138 may be defined as the length of the winglet body 120 along a reference line extending parallel to the Z axis from the interface 126 to a different radial location along the winglet body 122. For example, in several embodiments, the overall spanwise radius 138 of the winglet 120, measured from the interface 126 (i.e., the first end 124 of the winglet body 122) to the blade tip 104 (i.e., the second end 128 of the winglet body 122), may range from about 2000 millimeters (mm) to about 3750 mm, such as from about 2500 mm to about 3500 mm or from about 2750 mm to about 3250 mm and all other subranges therebetween. Alternatively, the spanwise radius 138 may be defined from the first spanwise location along the winglet body 122 that includes pre-bend 146. For instance, as shown in TABLE 1 below, in a particular embodiment of the present subject matter, the pre-bend 146 of the winglet 120 may originate at approximately 1000 mm from the interface 126, wherein the interface 126 generally corresponds to radial location #1. In such an embodiment, the spanwise radius 138 of the winglet 120, measured along the portion of the winglet 120 including pre-bend (e.g., from the first spanwise location including pre-bend 146 to the blade tip 104), may range from about 1500 mm to about 2500 mm, such as from about 1750 mm to about 2250 mm or from about 1900 mm to about 2100 mm and all other subranges therebetween.

Additionally, as shown FIGS. 4 and 5, the winglet 120 may define a chord 140 generally corresponding to the length of the winglet body 122 along a reference line extending between the leading and trailing edges 134, 136 of the winglet 120. It should be appreciated that, in several embodiments, the chord 140 may generally decrease along the spanwise radius 138 of the winglet 120 as the winglet body 122 extends from the interface 126 to the blade tip 104. For example, in a particular embodiment of the present subject matter, the chord 140 at the interface 126 (i.e., at the first end 124 of the winglet body 122) may range from about 750 millimeters (mm) to about 1260 mm, such as from about 850 mm to about 1150 mm or from about 950 mm to about 1050 mm and all other subranges therebetween and the chord 140 at the blade tip 104 (i.e., at the second end 128 of the winglet body 122) may range from about 35 mm to about 200 mm, such as from about 40 mm to about 100 mm or from about 45 mm to about 55 mm and all other subranges therebetween.

Moreover, the winglet 120 may also include a pitch axis 142 defined as a function of the chord 140 at each radial location along the spanwise radius 138 of the winglet 120. As is generally understood, the relative position of each cross-sectional profile to the pitch axis 142 may be used to control the shape of the leading and trailing edges 134, 136 of the winglet 120 and may also be used as the reference point for defining the twist angle 148 of the winglet 120. As shown in FIG. 5, in several embodiments, the pitch axis 142 may generally correspond to a point along the chord 140 of a cross-sectional profile of the winglet 120 at a particular radial location along the winglet body 122 and may be located a distance 158 from the leading edge 124 of the winglet 120 corresponding to a percentage of the chord 140. For instance, in one embodiment, the pitch axis 142 may be located a distance 158 from the leading edge 134 ranging from about 22% of the chord 140 at each radial location along the winglet body 122 to about 38% of the chord 140 at each radial location along the winglet body 122, such as from about 25% of the chord 140 to about 35% of the chord 140 or from about 28% of the chord 140 to about 32% of the chord 140 and all other subranges therebetween.

Further, the shape of the winglet body 122 may also be defined based on the translation or sweep 144 of the winglet 120 along the X axis. Specifically, as shown in FIG. 4, the sweep 144 may be measured along a reference line extending parallel to the X axis and may correspond to the distance along such reference line between a particular chord location of the winglet body 122 at the interface 126 (i.e., at the first end 124 of the winglet body 122) and a corresponding chord location at a different radial location along the winglet body 122. For instance, the amount of sweep 144 of the winglet 120 at a particular radial location along the winglet body 122 may be defined as the distance from a quarter chord location 160 at the interface 126 (i.e., a distance from the leading edge 134 equal to 25% of the chord 140 at the interface 126) to a quarter chord location at that particular radial location (i.e., a distance from the leading edge 134 equal to 25% of the chord 140 at the particular radial location). Thus, in several embodiments, the total amount of sweep 144 of the winglet 120 (defined from a quarter chord location 160 at the interface to a quarter chord location 162 at the blade tip 104) may range from about 580 mm to about 970 mm, such as from about 650 mm to about 850 mm or from about 700 mm to about 800 mm and all other subranges therebetween. It should be appreciated that a positive value for sweep 144 may generally translate the leading edge 134 of the winglet 120 in the positive X direction, as shown in FIG. 4. It should also be appreciated that, in alternative embodiments, the sweep 140 may be defined relative to any other suitable chord locations, such as 35% chord locations, 50% chord locations, 75% chord locations and the like.

Additionally, as shown in FIG. 3, the shape of the winglet body 122 may also be defined based on the height or amount of pre-bend 146 of the winglet 120. The pre-bend 146 may generally be measured along a reference line extending parallel to the Y axis and may correspond to the distance along such reference line between a particular chord location of the winglet body 122 at the interface 126 (i.e., at the first end 124 of the winglet body 122) and a corresponding chord location at a different radial location along the winglet body 122. For instance, the amount of pre-bend 146 at a particular radial location along the winglet 120 may be defined from the trailing edge 136 of the winglet body 122 at the interface 126 to the trailing edge 136 of the winglet body 122 at that particular radial location. Thus, in several embodiments, the total amount of pre-bend 146 of the winglet 120 (defined from the trailing edge 136 at the interface 126 to the trailing edge 136 at the blade tip 104) may range from about 1500 mm to about 3450 mm, such as from about 1750 mm to about 3250 mm or from about 2500 mm to about 3000 mm and all other subranges therebetween. It should be appreciated that a positive value for pre-bend 136 may generally be towards the pressure side 130 of the winglet 120 (i.e., in the negative Y direction).

Moreover, the winglet 120 may also be rotated about the pitch axis 142, thereby defining a twist angle 148 for setting the winglet's angle of attack relative to the wind direction. As shown in FIG. 5, the twist angle 148 at each cross-sectional profile of the winglet 120 may generally be defined relative to the leading edge 134 of the winglet 120 and may correspond to the angle between a reference line extending parallel to the chord 140 and a horizontal reference line extending through the pitch axis 142 at a zero degree twist angle 148. In several embodiments, the twist angle 148 of the winglet 120 may vary along the spanwise radius 138. For instance, in a particular embodiment of the present subject matter, the twist angle 148 at the interface 126 (i.e., at the first end 124 of the winglet body 122) may range from about −1.1 degrees to about −1.9 degrees, such as from about −1.3 degrees to about −1.7 degrees or from about −1.4 degrees to about −1.6 degrees and all other subranges therebetween. Similarly, the twist angle 148 at the blade tip 104 (i.e., at the second end 128 of the winglet body 122) may range from about −6.7 degrees to about −11.3 degrees, such as from about −7.5 degrees to about −10.5 degrees or from about −8.5 degrees to about −9.5 degrees and all other subranges therebetween. It should be appreciated that a negative value for the twist angle 148 generally corresponds to a rotation of the winglet 120 away from feather. In other words, a negative value for the twist angle 148 may rotate the leading edge 134 so as to increase the local angle of the attack of the winglet 120.

Further, the winglet 120 may also define a cant angle 150 corresponding to the rotation of the winglet body 122 about each local chord 140 along the spanwise radius 138. Specifically, as shown in FIG. 3, the cant angle 150 at a particular radial location along the winglet body 122 may be defined as the angle between a reference line extending parallel to the Z axis and a reference line extending tangent to the winglet 120 at that particular radial location. For instance, in several embodiments, the cant angle 150 at the blade tip 104 (i.e., at the second end 128 of the winglet body 122) may range from about 64 degrees to about 108 degrees, such as from about 70 degrees to about 100 degrees or from about 80 degrees to about 90 degrees. It should be appreciated that a positive value for the cant angle 150 will generate a pressure side winglet, as shown in the illustrated embodiment.

Additionally, as shown in FIG. 6, the winglet 120 also defines a toe angle 152 corresponding to the rotation of the winglet 120 about the Y axis at each radial location along the winglet body 122. Thus, the toe angle 152 for a particular radial location along the winglet body 122 may generally be defined as the angle between a reference line extending parallel to the X axis and a reference line extending parallel to the chord 140 at that radial location. Accordingly, in several embodiments, the toe angle 122 at the blade tip 104 (i.e., at the second end 128 of the winglet body 122) may range from about 0.62 degrees to about 1.04 degrees, such as from about 0.70 degrees to about 0.90 degrees or from about 0.78 degrees to about 0.88 degrees and all other subranges therebetween. It should be appreciated that a positive toe angle 152 may generally angle the leading edge 134 of the winglet 120 radially outwardly (i.e., away from the root 102 of the rotor blade 100 along the Z axis).

Moreover, the winglet 120 may also have a radius of curvature 154, 156 generally defining the overall curvature of the winglet body 122 in the Z-Y plane. For example, as shown in FIG. 3, the winglet 120 may define a first radius of curvature 154 in the Z direction and a second radius of curvature 156 in the Y direction. It should be appreciated that, in several embodiments, the first radius of curvature 154 may be the same the second radius of curvature 156. Alternatively, the first radius of curvature 154 may differ from the second radius of curvature 156. For instance, in one embodiment, the curvature of the winglet body 122 may be defined by a curve fit having a first radius of curvature 154 ranging from about 1500 mm to about 2500 mm, such as from about 1750 mm to about 2250 mm or from about 1950 mm to about 2050 mm and all other subranges therebetween, and a second radius of curvature 156 ranging from about 1200 mm to about 2000 mm, such as from about 1400 mm to about 1800 mm or from about 1550 mm to about 1650 mm and all other subranges therebetween. It should be appreciated that the curvature may generally be defined by any suitable curve fit, such as by an ellipse, parabolic fit, exponential fit or any other suitable type of curve fit.

Further, in a particular embodiment of the present subject matter, a nominal geometric shape of the winglet body 122 may be defined by the values provided in TABLE 1. As indicated above, the spanwise radius 138 of the winglet 120 may generally be defined relative to the interface 126 between the winglet body 122 and the body 106 (i.e., the first end 124 of the winglet body 122) and may extend from such interface 126 to the blade tip 104 ((i.e., the first end 124 of the winglet body 122). Thus, as shown in TABLE 1, the spanwise radius 138 at radial location #1 (i.e., defined at the interface 126 or first end 124) may be equal to 0.00 mm, with the spanwise radius 138 increasing to radial location #15 (i.e., defined at the blade tip 104 or second end 128). Moreover, in addition to the spanwise radius 138, values for the chord 140, pitch axis 142, sweep 144, pre-bend 146, twist angle 148, cant angle 150 and toe angle 152 of the winglet 120 at each radial location are provided so as to generally provide a complete nominal shape of the winglet body 122.

TABLE 1

| Radial Location | Spanwise Radius (mm) | Chord (mm) | Pitch Axis (% chord) | Sweep (mm) | Pre-bend (mm) | Twist Angle (deg) | Cant Angle (deg) | Toe Angle (deg) |
|---|---|---|---|---|---|---|---|---|
| 1 | 0.00 | 1007.60 | 0.31 | 0.00 | 0.00 | −1.48 | 0.00 | 0.00 |
| 2 | 782.00 | 977.00 | 0.31 | 0.00 | 0.00 | −1.63 | 0.00 | 0.00 |
| 3 | 891.00 | 973.48 | 0.31 | 0.00 | 0.00 | −1.63 | 0.00 | 0.00 |
| 4 | 1000.00 | 969.96 | 0.31 | 0.00 | 0.00 | −1.63 | 0.00 | 0.00 |
| 5 | 1235.73 | 954.20 | 0.31 | 4.19 | 22.94 | −1.63 | 0.12 | 0.00 |
| 6 | 1536.45 | 917.18 | 0.30 | 28.71 | 70.74 | −1.62 | 4.75 | 0.03 |
| 7 | 1848.06 | 857.10 | 0.30 | 75.63 | 156.29 | −1.66 | 12.93 | 0.09 |
| 8 | 2166.64 | 778.10 | 0.30 | 142.65 | 301.76 | −1.94 | 24.18 | 0.17 |
| 9 | 2472.62 | 684.33 | 0.30 | 226.03 | 523.24 | −2.68 | 37.88 | 0.26 |
| 10 | 2734.41 | 579.91 | 0.30 | 319.39 | 823.85 | −3.58 | 53.56 | 0.37 |
| 11 | 2914.99 | 468.99 | 0.30 | 413.82 | 1188.87 | −5.02 | 70.98 | 0.47 |
| 12 | 2982.63 | 355.71 | 0.30 | 500.09 | 1584.82 | −6.52 | 86.36 | 0.57 |
| 13 | 3007.78 | 244.21 | 0.30 | 580.93 | 1981.94 | −7.81 | 86.36 | 0.67 |
| 14 | 3032.94 | 138.63 | 0.30 | 657.69 | 2376.83 | −8.70 | 86.36 | 0.75 |
| 15 | 3056.15 | 50.00 | 0.30 | 722.40 | 2741.33 | −9.00 | 86.36 | 0.83 |

It should be appreciated by those of ordinary skill in the art that each radial location (radial location #s 1-15) provided in TABLE 1 generally corresponds to a particular location along the winglet body 122 at which a cross sectional profile (e.g., similar the cross-sectional profile shown in FIG. 5) of the winglet 120 is defined using the given values. Accordingly, it should be appreciated that the disclosed winglet 120 may be physically manufactured and/or graphically modeled using the values provided in TABLE 1 to define the shape and/or orientation of the cross-sectional profiles at each radial location. Such cross-sectional profiles may then be lofted, connected and/or otherwise joined using any suitable means known in the art (e.g., by connecting each cross-sectional profile with smooth continuing arcs using suitable computer modeling or drawing software) in order to define the total winglet shape.

Additionally, the values provided in TABLE 1 are shown to two decimal places for defining the shape of the winglet body 122. However, it is believed that the values defining the winglet shape may be varied without impairment of the advantages provided by the disclosed winglet 120. Accordingly, the values given in TABLE 1 are for a nominal winglet shape. It will therefore be appreciated that plus or minus (+/−) variations of each of the values provided in TABLE 1 including, but not limited to, +/− variations for manufacturing tolerances and other design considerations may be made without exceeding the scope of the present disclosure. For instance, in one embodiment, a margin of about +/−10% of the length values (i.e., spanwise radius 138, chord 140, pitch axis 142, sweep 144 and pre-bend 146) at each radial location, a margin of about +/−20 degrees of the cant angle values at each radial location and a margin of about +/−1 degree of the other angle values (i.e., twist angle 148 and toe angle 152) at each radial location may define a profile envelope for the winglet shape disclosed in TABLE 1. In another embodiment, the profile envelope for the winglet shape disclosed in TABLE 1 may be defined by a margin of about +/−5% of the length values at each radial location, a margin of about +/−10 degrees of the cant angle values at each radial location and a margin of about +/−0.5 degrees of the other angle values at each radial location.

It should also be appreciated that the nominal winglet shape provided above may be scaled up or down geometrically for use with rotor blades 100 having any suitable dimensions and/or configuration. Consequently, the values provided in TABLE 1 at each radial location may be a function of one or more constants. That is, the given values may be multiplied or divided by the same constant or by differing constants depending on the particular design parameter being scaled to provide a "scaled-up" or "scaled-down" version of the disclosed winglet 120, while retaining the winglet shape disclosed herein. This scaling could be used to adapt the winglet 120 to a larger or smaller blade. For instance, in one embodiment, one or more of the length values (i.e., spanwise radius 138, chord 140, pitch axis 142, sweep 144 and pre-bend 146) may be multiplied or divided by a first constant and one or more of the angle values (i.e., twist angle 148, cant angle 150 and toe angle 152) may be multiplied or divided by a second constant.

Additionally, as an alternative to defining the shape of the winglet body using all of the values provided in TABLE 1, the winglet shape may also be defined using the table values for a combination of two or more design parameters at each radial location. For instance, in several embodiments, the disclosed winglet 120 may be defined at each radial location simply using the values for chord 140 and twist angle 148 provided in TABLE 1. In such embodiments, the values for chord 140 may generally be varied +/−25% at each radial location and the values for twist angle 148 may generally be varied +/−2.5 degrees at each radial location to accommodate manufacturing tolerances and other design considerations. In other embodiments, various other combinations of design parameters may be used to define the winglet 120, such as by using the values for sweep 144 and pre-bend 146 at each radial location or by using the values for sweep 144 and cant angle 150 at each radial locations, with the values of such combinations having a suitable +/− variation to accommodate manufacturing tolerances and other design considerations.

Moreover, it should be appreciated that, in addition to the advantages provided by the unique shape of the disclosed winglet 120, further advantages may be obtained when the winglet 120 comprises a separate component configured to be separately attached to the body 106 of the rotor blade 100. In particular, a modular configuration may allow the winglet 120 to be easily and efficiently manufactured and stored, thereby reducing overall production costs. Additionally, as a separate component, the winglet 120 may be easily transported from the manufacturing facility to the field and may be mounted into the rotor blade 100 without the necessity of removing such rotor blade 100 from the wind turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A rotor blade for a wind turbine, comprising:
  a blade body extending from a blade root towards a blade tip, the blade body defining a spanwise direction:
  a winglet body extending between a first end defined at an interface between the blade body and the winglet body and a second end defined at the blade tip, the winglet body defining a sweep and having a curvature defined by a curve fit including a first radius of curvature and a second radius of curvature, the sweep at a particular radial location along the winglet body being defined as a distance between a first chord location at the interface and a second chord location at the particular radial location, the first radius of curvature being defined relative to a first reference axis extending parallel to the spanwise direction of the blade body, the second radius of curvature being defined relative to a second reference axis extending perpendicular to the first reference axis, the first chord location being defined at a pre-defined percentage of a chord of the winglet body at the interface, the second chord location being defined at the pre-defined percentage of the chord at the particular radial location,
  wherein the sweep defined between the first end and the second end ranges from about 580 millimeters to about 970 millimeters,
  wherein the first radius of curvature ranges from about 1500 millimeters to about 2500 millimeters and the second radius of curvature ranges from about 1200 millimeters to about 2000 millimeters.

2. The winglet of claim 1, wherein the chord of the winglet body at the first end ranges from about 750 millimeters to about 1260 millimeters.

3. The winglet of claim 1, wherein the chord of the winglet body at the second end ranges from about 35 millimeters to about 200 millimeters.

4. The winglet of claim 1, wherein the winglet body further defines a toe angle, the toe angle at the second end ranging from about 0.62 degrees to about 1.04 degrees.

5. The winglet of claim 1, wherein the winglet body further defines a spanwise radius, the spanwise radius defined between the first end and the second end ranging from about 2000 millimeters to about 3750 millimeters.

6. The winglet of claim 1, wherein the winglet body further defines a spanwise radius and a pre-bend, the spanwise radius of a portion of the winglet body including pre-bend ranging from about 1500 mm to about 2500 mm.

7. The winglet of claim 1, wherein the winglet body further defines a twist angle, the twist angle at the first end ranging from about −1.1 degrees to about −1.9 degrees.

8. The winglet of claim 1, wherein the winglet body further defines a twist angle, the twist angle at the second end ranging from about −6.7 degrees to about −11.3 degrees.

9. The winglet of claim 1, wherein the winglet further defines a cant angle, the cant angle at the second end ranging from about 64 degrees to about 108 degrees.

10. The winglet of claim 1, wherein the winglet body further defines a pre-bend, the pre-bend defined between the first end and the second end ranging from about 1500 millimeters to about 3450 millimeters.

11. A rotor blade for a wind turbine, comprising:
a blade body extending from a blade root towards a blade tip;
a winglet body extending between a first end defined at an interface between the blade body and the winglet body and a second end defined at the blade tip and including a plurality of radial locations between the first and second ends, the winglet body extending in a chordwise direction between a leading edge and a trailing edge, the winglet body defining a chord and a twist angle at each of the plurality of radial locations generally in accordance with the values for chord and twist angle shown in TABLE 1, the chord being measured along a reference line extending between the leading and trailing edges of the winglet body, the winglet body further defining a pitch axis, the twist angle corresponding to an angle defined between a first reference line extending parallel to the chord and a second reference line extending through the pitch axis at a zero degree twist angle,
wherein each of the values for chord shown in TABLE 1 may be varied +/−10% and each of the values for twist angle shown in TABLE 1 may be varied +/−1 degree.

12. The winglet of claim 11, wherein the winglet body further defines a cant angle, the cant angle at the second end ranging from about 64 degrees to about 108 degrees.

13. The winglet of claim 11, wherein the winglet body further defines a pre-bend, the pre-bend defined between the first end and the second end ranging from about 1500 millimeters to about 3450 millimeters.

14. The winglet of claim 11, wherein the winglet body further defines a spanwise radius, the spanwise radius defined between the first end and the second end ranging from about 2000 millimeters to about 3750 millimeters.

15. The winglet of claim 11, wherein the winglet body further defines a spanwise radius and a pre-bend, the spanwise radius of a portion of the winglet body including pre-bend ranging from about 1500 mm to about 2500 mm.

16. The winglet of claim 11, wherein the winglet further defines a sweep, the sweep defined between the first end and the second end ranging from about 580 millimeters to about 970 millimeters.

17. The winglet of claim 11, wherein the winglet further defines a toe angle, the toe angle at the second end ranging from about 0.62 degrees to about 1.04 degrees.

18. The winglet of claim 11, wherein the winglet body has a curvature defined by a curve fit having a first radius of curvature and a second radius of curvature, the first radius of curvature ranging from about 1500 millimeters to about 2500 millimeters and the second radius of curvature ranging from about 1200 millimeters to about 2000 millimeters.

19. A winglet for a rotor blade, comprising:
a winglet body, the winglet body defining cross-sectional profiles at a plurality of radial locations along the winglet body generally in accordance with the values shown in TABLE 1, the cross-sectional profiles being joined so as to define a nominal shape of the winglet body,
wherein the nominal shape lies in an envelope within +/−10% of each length value provided in TABLE 1, within +/−20 degrees of each cant angle value provided in TABLE 1 and within +/−1 degree of each toe angle and twist angle value provided in TABLE 1,
wherein the length values correspond to a spanwise radius of the winglet body, a chord of the winglet body, a pitch axis of the winglet body, a sweep of the winglet body and a pre-bend of the winglet body.

20. The winglet of claim 19, wherein the nominal shape lies in an envelope within +/−5% of each length value provided in TABLE 1, within +/−10 degrees of each cant angle value provided in TABLE 1 and within +/−0.5 degrees of each toe angle and twist angle value provided in TABLE 1.

* * * * *